US008447785B2

(12) United States Patent  
Liu et al.

(10) Patent No.: US 8,447,785 B2
(45) Date of Patent: May 21, 2013

(54) PROVIDING CONTEXT AWARE SEARCH ADAPTIVELY

(75) Inventors: Zhen Hua Liu, San Mateo, CA (US);
Thomas Baby, Maple Valley, WA (US);
Sukhendu Chakraborty, San Francisco, CA (US); Junyan Ding, Palo Alto, CA (US); Anguel Novoselsky, Foster City, CA (US); Vikas Arora, San Francisco, CA (US)

(73) Assignee: Oracle International Corporation, Redwood Shores, CA (US)

( * ) Notice: Subject to any disclaimer, the term of this patent is extended or adjusted under 35 U.S.C. 154(b) by 133 days.

(21) Appl. No.: 12/792,659

(22) Filed: Jun. 2, 2010

(65) Prior Publication Data

US 2011/0302189 A1 Dec. 8, 2011

(51) Int. Cl.
G06F 17/30 (2006.01)

(52) U.S. Cl.
USPC .......................................................... 707/796

(58) Field of Classification Search
USPC ................. 707/711, 715, 741, 778, 793, 797, 707/802
See application file for complete search history.

(56) References Cited

U.S. PATENT DOCUMENTS

| | | | |
|---|---|---|---|
| 6,421,656 B1 | 7/2002 | Cheng et al. | |
| 6,535,970 B1 | 3/2003 | Bills et al. | |
| 6,853,992 B2 | 2/2005 | Igata | |
| 7,162,485 B2 * | 1/2007 | Gottlob et al. | 707/769 |
| 7,281,206 B2 * | 10/2007 | Schnelle et al. | 715/227 |
| 7,366,735 B2 | 4/2008 | Chandrasekar et al. | |
| 7,499,915 B2 | 3/2009 | Chandrasekar et al. | |
| 7,680,764 B2 | 3/2010 | Chandrasekar et al. | |
| 7,734,631 B2 | 6/2010 | Richardson et al. | |
| 7,836,098 B2 | 11/2010 | Baby et al. | |
| 7,870,124 B2 | 1/2011 | Liu et al. | |
| 7,885,980 B2 * | 2/2011 | Tarachandani et al. | 707/802 |
| 7,917,515 B1 * | 3/2011 | Lemoine | 707/741 |
| 8,024,329 B1 * | 9/2011 | Rennison | 707/723 |
| 8,090,731 B2 * | 1/2012 | Sthanikam et al. | 707/756 |
| 8,255,394 B2 * | 8/2012 | Branigan et al. | 707/726 |
| 2002/0065822 A1 | 5/2002 | Itani | |
| 2002/0116371 A1 | 8/2002 | Doods et al. | |
| 2002/0147748 A1 | 10/2002 | Huang et al. | |
| 2003/0014397 A1 | 1/2003 | Chau et al. | |
| 2003/0035000 A1 | 2/2003 | Licon et al. | |

(Continued)

OTHER PUBLICATIONS

U.S. Appl. No. 12/491,981, filed Jun. 25, 2009, Final Office Action, Mailing Date Nov. 21, 2012.

Primary Examiner — Cam-Linh Nguyen
(74) Attorney, Agent, or Firm — Hickman Palermo Truong Becker Bingham Wong LLP

(57) ABSTRACT

A method, computing device, and a non-transitory computer-readable medium is provided for facilitating a context-aware search on documents stored in an unstructured database column. The database server determines whether a document stored in an unstructured database object is marked up according to a recognized markup language. Documents that conform to the markup language are indexed with value-to-node mappings and node-to-physical-location mappings to provide a context-aware search of marked up nodes within the documents. Documents that do not conform to the markup language are indexed with value-to-document mappings to provide a full-text search of the documents. The database server evaluates a context-aware search against documents that conform to the markup language within the unstructured column without requiring the user identify the documents as XML documents and store the documents in an XMLType structured column.

34 Claims, 9 Drawing Sheets

U.S. PATENT DOCUMENTS

| | | |
|---|---|---|
| 2003/0088558 A1 | 5/2003 | Zaharioudakis et al. |
| 2003/0120671 A1 | 6/2003 | Kim et al. |
| 2003/0158854 A1 | 8/2003 | Yoshida et al. |
| 2003/0182268 A1 | 9/2003 | Lal |
| 2004/0060007 A1 | 3/2004 | Gottlob et al. |
| 2004/0210573 A1 | 10/2004 | Abe et al. |
| 2005/0091188 A1 | 4/2005 | Pal et al. |
| 2005/0228818 A1 | 10/2005 | Murthy et al. |
| 2005/0228828 A1 | 10/2005 | Chandrasekar et al. |
| 2005/0229158 A1 | 10/2005 | Thusoo et al. |
| 2005/0289175 A1 | 12/2005 | Krishnaprasad et al. |
| 2006/0047646 A1 | 3/2006 | Maluf et al. |
| 2006/0101320 A1 | 5/2006 | Doods et al. |
| 2006/0167928 A1 | 7/2006 | Chakraborty et al. |
| 2006/0212420 A1 | 9/2006 | Murthy et al. |
| 2006/0242574 A1 | 10/2006 | Richardson et al. |
| 2007/0016604 A1 | 1/2007 | Murthy et al. |
| 2007/0016605 A1 | 1/2007 | Murthy et al. |
| 2007/0174309 A1 | 7/2007 | Pettovello |
| 2007/0198479 A1 | 8/2007 | Cai et al. |
| 2007/0234199 A1 | 10/2007 | Astigeyevich |
| 2007/0240035 A1 | 10/2007 | Sthanikam et al. |
| 2007/0255748 A1 | 11/2007 | Ferragina et al. |
| 2007/0271243 A1* | 11/2007 | Fan et al. ............ 707/3 |
| 2007/0299811 A1 | 12/2007 | Chandrasekar et al. |
| 2008/0059417 A1 | 3/2008 | Yamada et al. |
| 2008/0098020 A1 | 4/2008 | Gupta et al. |
| 2008/0114725 A1* | 5/2008 | Indeck et al. ............ 707/2 |
| 2008/0215527 A1 | 9/2008 | Charlet et al. |
| 2008/0301129 A1* | 12/2008 | Milward et al. ............ 707/5 |
| 2009/0089263 A1* | 4/2009 | McHugh et al. ............ 707/3 |
| 2009/0265339 A1* | 10/2009 | Chen et al. ............ 707/5 |
| 2009/0288026 A1 | 11/2009 | Barabas et al. |
| 2010/0169354 A1 | 7/2010 | Baby |
| 2010/0185683 A1 | 7/2010 | Baby et al. |
| 2010/0228781 A1 | 9/2010 | Fowler |
| 2010/0312771 A1 | 12/2010 | Richardson et al. |
| 2010/0332966 A1 | 12/2010 | Idicula et al. |
| 2011/0106811 A1 | 5/2011 | Novoselsky |
| 2011/0179085 A1* | 7/2011 | Hammerschmidt et al. .. 707/797 |
| 2011/0208730 A1 | 8/2011 | Jiang et al. |

\* cited by examiner

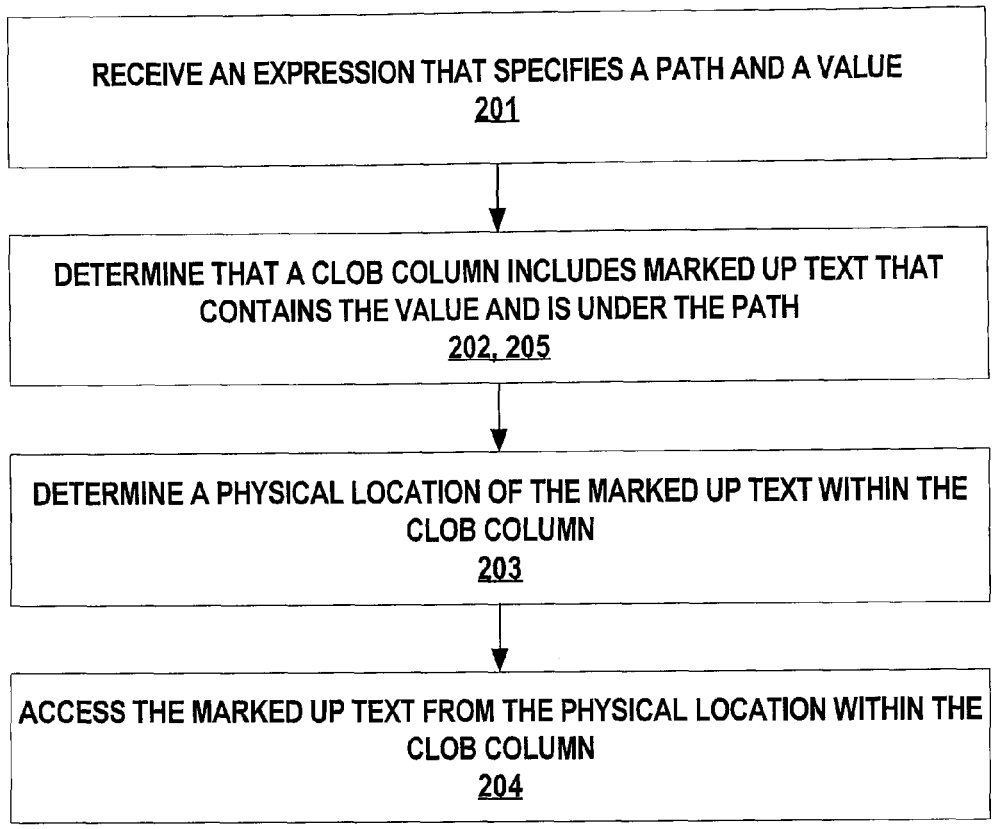

```
<a name="bcd">
    <b>
        "efg"
    </b>

<c>
        <d>
            "hij"
        </d>
    </c>
</a>
```

FIG. 4A

PROVIDING CONTEXT AWARE SEARCH ADAPTIVELY

RELATED APPLICATIONS

The present application is related to: (1) U.S. patent application Ser. No. 12/610,047, entitled Efficient XML Tree Indexing Structure Over XML Content, filed on Oct. 30, 2009, the entire contents of which are incorporated herein by reference; (2) U.S. patent application Ser. No. 12/491,981, entitled A Technique For Skipping Irrelevant Portions Of Documents During Streaming XPath Evaluation, filed on Jun. 25, 2009, the entire contents of which are incorporated herein by reference; (3) U.S. patent application Ser. No. 12/346,393, entitled An Indexing Strategy With Improved DML Performance And Space Usage For Node-Aware Full-Text Search Over XML, filed on Dec. 30, 2008, the entire contents of which are incorporated herein by reference; (4) U.S. patent application Ser. No. 12/346,327, entitled An Indexing Mechanism For Efficient Node-Aware Full-Text Search Over XML, filed on Dec. 30, 2008, the entire contents of which are incorporated herein by reference; (5) U.S. Pat. No. 7,499,915, entitled Index For Accessing XML Data, filed on Jul. 2, 2004, the entire contents of which are incorporated herein by reference; (6) U.S. Pat. No. 7,024,425, entitled Method And Apparatus For Flexible Storage And Uniform Manipulation of XML Data In A Relational Database System, filed on Sep. 6, 2001, the entire contents of which are incorporated herein by reference; and (7) U.S. Pat. No. 6,871,204, entitled Apparatus And Method For Mapping Relational Data And Metadata To XML, filed on Sep. 6, 2001, the entire contents of which are incorporated herein by reference.

FIELD OF THE INVENTION

The present invention relates to providing context aware search against raw data. Specifically, context aware search is provided in a manner that preserves document fidelity of the raw data.

BACKGROUND

Marked Up Data

Applications often store data as text documents with contextual clues provided within the text. A "context" may be provided for a data value by tagging or labeling the data value within the text. The context for a data value may be provided by a single label or a combination of labels, such as a hierarchical path of labels. In one example, a value of "Tom" may be prefaced with a label of "Name". Various markup signals may be used to distinguish between the data values and the labels themselves. For example, a label may be marked with a "//", such as in "//Name Tom," or a "-", such as in "-Name Tom". In many markup languages, the label is provided within angle brackets, such as in "<Name>Tom." The end of the data value may also be marked. For example, the end may be marked with "</Name>." The end may also be marked by the beginning of another label, for example "-Name Tom -Age 25". The marked up data may indicate a hierarchical structure such that a single data value falls under a path of labels, such as in "<CONTACT><NAME>Tom</NAME></CONTACT>," where "Tom" falls under the path of "CONTACT/NAME." Alternately, data values may be marked with individual labels that do not specify a hierarchical path, such as in "-Name Tom-Age 25." In order to provide a concise explanation, the techniques described herein use Extensible Markup Language (XML) as the example markup language. However, other markup languages may be used instead of or in addition to XML to provide contextual information according to the techniques described herein.

XML

Extensible Markup Language (XML) is a World Wide Web Consortium (W3C) standard for representing data. Many applications are designed to output data in the form of XML documents. Various techniques may be used to store data from such XML documents into a relational database. XML serves as an exemplary markup language that may be used with the techniques described herein.

XML data comprises structured data items that form a hierarchy. In XML, data items known as elements are delimited by an opening tag and a closing tag. An element may also comprise attributes, which are specified in the opening tag of the element. Text between the tags of an element may represent any sort of data value, such as a string, date, or integer. An element may have one or more children. The resulting hierarchical structure of XML-formatted data is discussed in terms akin to those used to discuss a family tree. For example, a sub-element is said to descend from its parent element or any element from which its parent descended. A parent element is said to be an ancestor element of any sub-element of itself or of one of its descendant elements. Collectively, an element along with its attributes and descendants, are referred to as a tree or a sub-tree.

XML Query and XPATH

XML Query Language (XQuery) and XML Path Language (XPath) are important standards for a query language, which can be used in conjunction with SQL to express a large variety of useful queries to search within XML data. XPath is described in XML Path Language (XPath), version 1.0 (W3C Recommendation 16 Nov. 1999), herein incorporated by reference and available at the time of writing at http://www.w3.org/TR/xpath, as well as in XML Path Language (XPath) 2.0 (W3C Recommendation 23 Jan. 2007), herein incorporated by reference and available at the time of writing at http://www.w3.org/TR/xpath. XQuery is described in XQuery 1.0: An XML Query Language (W3C Recommendation 23 Jan. 2007), herein incorporated by reference and available at the time of writing at http://www.w3.org/TR/xquery.

Path Expressions

The structure of an XML document establishes parent-child relationships between the nodes within the XML document. The "path" for a node in an XML document reflects the series of parent-child links, starting from a "root" node, to arrive at the particular node. For example, the path to the ID node in the example XML document 105 shown in FIG. 1A is /CONTACT/ACCOUNT/ID, since the "ID" node is a child of the "ACCOUNT" node, and the "ACCOUNT" node is a child of the "CONTACT" node.

Storing and Querying XML Data

A large portion of XML data is stored in databases as unstructured database objects that store the data as a single item of raw text. For example, XML data is frequently stored in unstructured database columns such as character large object (CLOB) columns, variable character field (VAR- CHAR) columns, or binary large objects (BLOB) columns. A full-text search may be performed on CLOB, VARCHAR, and BLOB columns of a table by submitting a database query that causes a database server to perform a full-text search on the columns. A full-text search on CLOB, VARCHAR, and BLOB columns is performed by scanning the entire column for a specified text value. Alternately, in order to more efficiently process the query, the database server may use a text index that associates the text value with one or more of the rows that contain the text value. Storing an XML document as a single data item of raw text is convenient in that the user does not even need to know whether or not the data conforms to XML in order to store the data in an unstructured column. The XML data does not need to be processed or decomposed before the XML data is stored in the database, and storing the XML document as a single data item of raw text maintains document fidelity or text fidelity on a byte-by-byte, or character-by-character basis. Because document fidelity is maintained, the storage of an XML document as a single data item of raw text may be accomplished without interfering with applications, developers, or users that utilize the original XML document.

Text-based search over data items of raw text, such as CLOB columns, VARCHAR columns, or BLOB columns, is efficient for basic keyword searches, but text-based search does not address a context in which the keywords occur in the XML document. When XML documents are stored as raw text in an unstructured column, database servers have been unable to take advantage of the fact that XML documents contain tagged content, where a single XML document may include a variety of named attributes and elements with specific data values.

XMLType Data

According to an alternative technique, if the user knows a document conforms to XML, the user may split up the XML document into its constituent attributes and elements before the XML document is stored in the database. For example, documents that conform to XML may be stored in an XML-Type datatype column in the relational database, as described in U.S. Pat. No. 7,024,425, entitled Method And Apparatus For Flexible Storage And Uniform Manipulation of XML Data In A Relational Database System, which has been incorporated by reference herein. When the XML document is stored in the XMLType column, the database server maps attributes and elements of the XML document to separate columns in the relational database, and the database server stores mapping information that maps the attributes and elements of the XML document to the columns in the relational database where the attributes and elements are actually stored. The storage of data as XMLType destroys the document fidelity of the data by causing the data to be decomposed into relational objects that represent nodes of XML content. The database server presents the XML document as a single data item of the XMLType abstract datatype even though separate attributes and elements of the XML document are mapped to the separate relational columns. If an XML user submits a query to search XML documents for a value of a particular element, then the XML user's query is rewritten to access the relational column that holds values for the particular element. Although the user does not need to be as familiar with the structure of the document, the user still needs to identify the document as an XML document by storing the document in a structured database column specifically designed for XML documents.

If there is no relational column that holds the values for the particular element searched for, then the value may be found in a CLOB subsumed within an XMLType item in an XML-Type column. The CLOB portion of the XMLType item is not exposed to the user as a CLOB column, and, because the CLOB portion is within the XMLType item, only data that conforms to XML may be stored in such a CLOB portion. XMLType preserves DOM (Document Object Model) fidelity by allowing a structured representation of the document to be constructed by scanning the entire document. A DOM is a structured representation of the entire XML document that is constructed in memory when XML data stored in a CLOB portion of an XMLType item is accessed using a path-based expression. The DOM provides information about hierarchical relationships between nodes within the document. XQuery may be used to search XMLType data in a manner that is aware of the context in which the text occurs in XML documents, but XQuery is not available for documents that have not been identified by the user and stored as XML documents. Document fidelity is destroyed when XML data is stored in the database as the XMLType datatype. Database servers have not been able to process an XQuery without constructing a DOM when the underlying data is stored in CLOB, VARCHAR, or BLOB portions of XMLType items. Thus, users who wish to maintain document fidelity for the underlying data have not been able to efficiently perform context aware search.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

Various embodiments of the present invention are illustrated by way of example, and not by way of limitation, in the figures of the accompanying drawings and in which like reference numerals refer to similar elements and in which:

FIG. 2A and FIG. 2B are diagrams illustrating example steps for performing a context-aware search for marked up text in a CLOB column.

FIG. 4A is an example XML document.

DETAILED DESCRIPTION

Figure 1A:
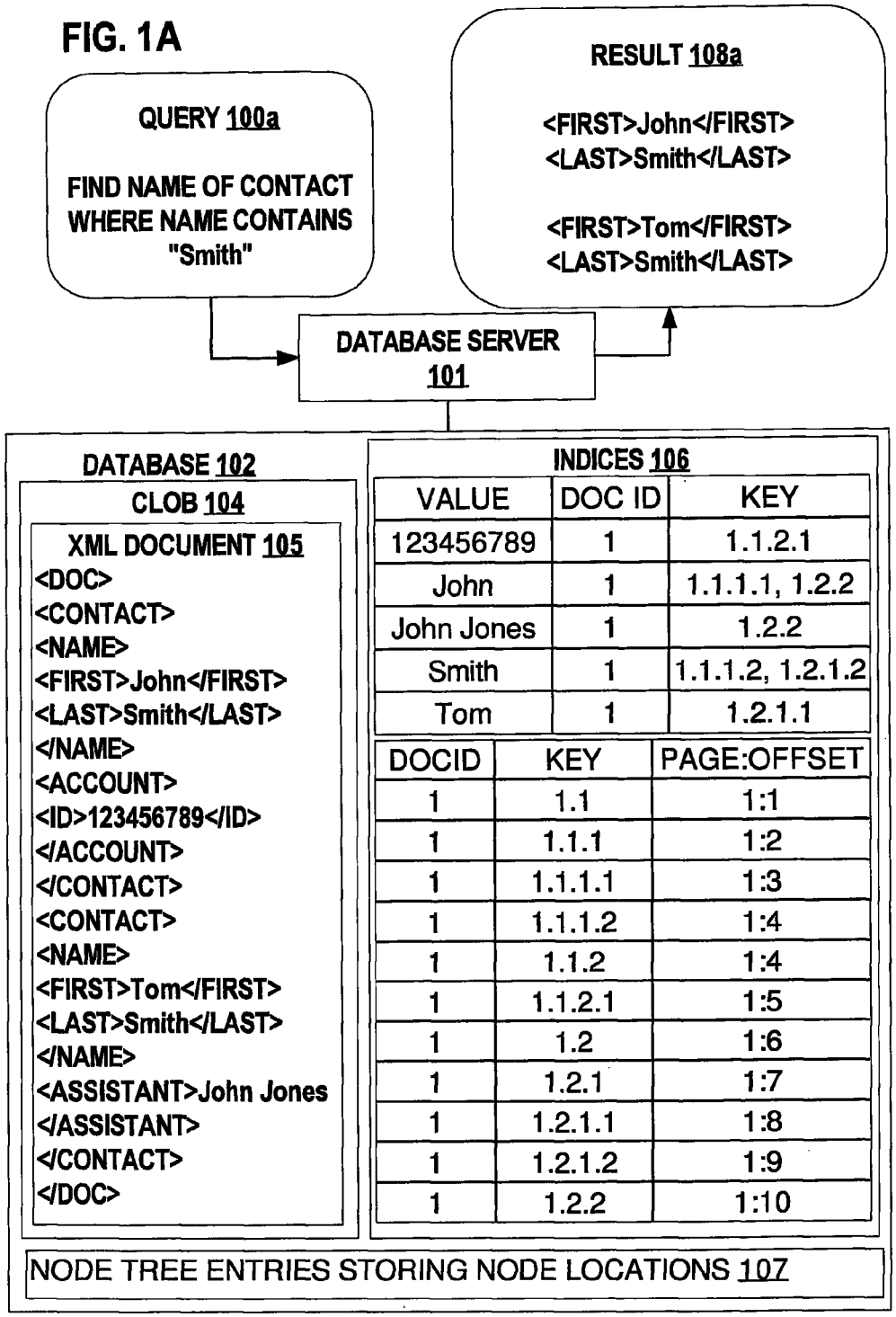
FIG. 1A and FIG. 1B are diagrams illustrating an example database server for evaluating queries by mapping values to nodes within an XML document, and mapping the nodes to locations of the nodes within the XML document.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

A method, computing device, and a non-transitory computer-readable medium is described for providing a context-aware search on documents stored in unstructured database columns such as variable character field columns, character large object columns, or binary large object columns. The database server determines whether a document stored in an unstructured database column is marked up according to a recognized markup language. Documents that conform to the markup language are indexed with value-to-node mappings and node-to-physical-location mappings to provide a context-aware search of marked up nodes within the documents. Documents that do not conform to the markup language are indexed with value-to-document mappings to provide a full-text search of the documents. The database server evaluates a context-aware search against documents that conform to the markup language within the unstructured column without requiring the user to store the documents in an XMLType structured column.

As used herein, the term "column" is intended to be inclusive of any logical container that stores data of a particular type. A "structured column" is a logical container that stores data of a type that conforms to a particular markup format in a manner that leverages the particular markup format. In one embodiment, storing data in a structured column destroys document fidelity for the data. For example, the XMLType column is one example of a structured column that stores XML data and leverages the structure of XML data. An "unstructured column" is a logical container that stores data of a type that may or may not conform to a markup format, and data may be stored in an unstructured column without knowledge of the underlying format of the data. In one embodiment, data may be stored in the unstructured column in a manner that maintains document fidelity for the data. The CLOB column is one example of an unstructured column.

In one embodiment, a database server stores a set of raw data such as an XML document in the unstructured database column in a manner that does not require the user to identify or store the document as an XML document, and in a manner that preserves document fidelity for the XML document. If the document is an XML document, then the database server indexes the document to provide a context-aware search of the document and a full-text search of the document. If the document is not an XML document, then the database server indexes the document to provide full-text search of the document but not context-aware search of the document.

In one embodiment, on a document by document basis, the database server determines whether or not the data stored in the unstructured database column includes text that is marked up according to a markup language such as GML (Generalized Markup Language), SGML (Standard Generalized Markup Language), XML (Extensible Markup Language), HTML (Hypertext Markup Language), XHTML (Extensible Hypertext Markup Language), TeX (Tau Epsilon Chi, a text description language), LaTeX (a more robust markup language developed from TeX by Leslie Lamport), PDF (portable document format), Word (a document format), or any markup language that specifies context information. A marked up document may be described as individual nodes that are each marked with a context such as an XML tag or another type of marking. In one embodiment, the database server indexes marked up documents stored in the unstructured database column by mapping values or keywords in the documents to individual nodes of the documents that contain the keywords.

Once the database server has determined that an unstructured column stores a marked up document, the database server maps individual nodes of the marked up document to physical locations where the individual nodes are stored within the marked up document. In this manner, support for a context-aware search is provided without requiring the document to be identified and stored as an XML document, without physically migrating the data to an XMLType datatype structured database column, and without decomposing the document into various relational parts. Using the techniques described, context-aware search becomes available for marked up documents stored as an unstructured data type even though context and structure are not inherent characteristics for data of the unstructured data type. At the time the document is stored, the user may not even be aware of whether or not the document conforms to any markup languages.

Techniques described herein feature a database server that provides access to a database by evaluating queries that are submitted against the database. In one embodiment, the database server receives a query that specifies a value and a context such as a hierarchical path. The database server determines that an unstructured database column in the database stores a document or other set of marked up text that contains the value. The database server determines a physical location within the document of a node of marked up text that contains the value. The node may then be accessed by the database server from the physical location of the node within the document without accessing other nodes from other locations within the document. The database server also determines that the node is marked, according to a markup language, with the context specified in the query. Thus, a search may be efficiently evaluated against the node in the unstructured document without scanning the entire document, and without creating an in-memory representation of the entire document.

Pay-as-You-go Architecture

Techniques described herein provide users with a "pay-as-you-go" architecture that allows users to store documents in unstructured database columns without requiring the user to make a determination as to whether the data conforms to a particular markup language. An efficient context-aware full-text search is provided on the documents that do conform, and plain text search is provided on the documents that do not conform. In one embodiment, a domain index is created by the database server over CLOB, BLOB, and/or VARCHAR columns that store items of marked up data without requiring the user to identify the items of marked up data, and without requiring the user to physically migrate data into XMLType structured database objects. The domain index is an XQuery-based full-text XMLIndex that is applied to the result of a function that recognizes marked up text within the unstructured database column. Through the function, users may skip data that is not recognizable as marked up text, treat data that is not recognizable as marked up text as regular text, or parse nodes of recognized marked up text in order to provide a context-aware evaluation of queries against the marked up text. In one embodiment, the index can provide both XQuery-based full-text search for data that conforms to XML and regular text search for text that does not conform to XML. Over time, as users become attracted to the XQuery full text search capability, users will be more inclined to add tags to their data to make their data recognizable as valid XML documents. Once the documents are recognized as valid XML documents by the database server, the users will be able to do more context aware search from the XQuery full-text search.

Storing Documents

A set of raw data may be stored in an unstructured database column without requiring the user to identify the set of data as marked up data or non-marked up data, and without requiring the user to identify a markup language to which the data does or does not conform. In one embodiment, the data is stored in a manner such that the document and the data stored in the unstructured column are the same byte-for-byte, and character-for-character. The raw data may be any type of data. In one embodiment, the raw data is an XML document to be stored in a database. The text of the XML document, including the tags that define nodes of the XML document, is stored in a CLOB column without requiring a decomposition of the XML document. For example, a table may be created to store data in a CLOB column using the following expression: "create table foo(id number, mytxt clob);". Any type of textual data may be stored in a CLOB column.

In one embodiment, the raw data is other textual data that is marked up according to a markup language known to the database server. In yet another embodiment, the raw data is binary data that represents textual data that is marked up according to a markup language, and the binary data is stored in a BLOB column. In other embodiments, the raw data does not conform to the markup languages that are recognized by the database server, and the raw data is not recognized as marked up data by the database server. The original document may or may not include any contextual information that describes text within the document.

Parsing Documents

In one embodiment, the set of data stored in the unstructured database column is analyzed by the database server to determine whether the set of data conforms to a markup language. For example, the database server may determine that the set of data conforms to XML, with data values embedded in start tags and end tags. A data value embedded within a start tag and an end tag may be said to have a context as defined by the start tag and/or the end tag. In one example, a value within the text may be tagged as a "NAME" by tags such as "<NAME>" and "</NAME>" that also appear within the text. The start tags and end tags of an XML document are provided as merely one example of providing context information within text. Other markup languages provide context information in the text to mark up values using other formats. As used herein, the term "tag" is not necessarily limited to the start tags and end tags of an XML document. A tag includes any context information that is provided for a value in the text.

As used herein, the term "node" may refer to a marked up label itself or to text for which the marked up label provides a full or partial context. In the XQuery Data Model, for example, the types of nodes may include: element nodes, attribute nodes, text nodes, comment nodes, processing instruction nodes, or document nodes. XQuery full text provides context aware search by enabling user to query whether a node contains text. The node here provides a context within which the search of the text is conducted. In one example shown in FIG. 1A, XML Document 105 includes a root element node <DOC> wrapping two <CONTACT> element nodes. The first CONTACT node and the second CONTACT node both include a NAME element node. Further as shown, the NAME node includes a FIRST node and a LAST node. The first CONTACT node additionally includes an ACCOUNT node that includes an ID node. The second CONTACT node additionally includes an ASSISTANT node. In one example shown, the NAME node under the first CONTACT node has a value of "<FIRST>John</FIRST> <LAST>Smith</LAST>," and the NAME node under the second CONTACT node has a value of "<FIRST>Tom</FIRST> <LAST>Smith</LAST>."

In one embodiment, an XMLParse function is used to parse documents and determine whether or not documents stored in an unstructured database column conform to XML. The XMLParse function is called by an XMLParse expression that provides the flexibility of determining whether or not to ignore the document if the document does not conform to XML. In one example, the expression, XMLParse(SKIP clob/blob/varchar as input), returns NULL if the input is not a valid XML document. In another example, the expression, XMLParse(LAX clob/blob/varchar as input), returns an XML text node whose content is from the input text content if the input is not a valid XML document. Otherwise, the parse function returns the valid XML document from the input. In yet another example, the user may supply a Convert function to determine whether or not documents in a set of documents stored as unstructured data conform to a markup language, and also to optionally convert these documents to conform to a markup language. The techniques described herein are not limited to any particular technique for determining whether data is marked according to a markup language.

In one embodiment, the output of a parse function on an unstructured database column is indexed. In one example, an index is created on the output of a parse function on a CLOB column mytext as follows: "create index foo_xidx on foo p (xmlparse(LAX p.mytxt)) indextype is xdb.xmlindex parameters('FULL_TEXT FOO_$I FULL_TEXT_RELATIONAL');". The XMLParse( ) function in the domain index definition provides the flexibility of determining how to convert text into XML or ignore the text if the document does not conform to XML. If the document in the unstructured database column does not conform to a markup language recognized by the parse function, then the indexed value is an XML text node whose content is the non-marked-up text from the document in the CLOB column. A non-context-aware full-text search is available on the document stored in the CLOB column even though the document does not conform to XML. If the document in the unstructured database column does conform to the markup language recognized by the parse function, then the document in the unstructured database column is indexed in order to provide context-aware search of the marked up document within the unstructured column. In one embodiment, a node tree index is created on unstructured database column. The node tree index stores structural information about the data if the data conforms to XML.

Storing Physical Location of Node

If a document conforms to a markup language, a physical location of the nodes within the document is stored to facilitate access to the nodes during execution of a query against the nodes. The physical location of a node identifies a point in the document where the node is stored. A node may be retrieved directly from the physical location without requiring a scan of the document for a tag, label, or value associated with the node in the document. The physical location allows the node to be retrieved without sifting through other nodes of the document or other nodes of other documents. In one embodiment, the Node Tree Index can be used to provide physical location of a node. The node tree index is stored in a shadow column that is hidden from user and stored in association with the unstructured database column. In a node tree index, each node has a node address, which is a page number and offset within the page where the node is located. In one embodiment of node tree index where fixed and variable length content are separated so that each node has a fixed size, for example, 32 bytes fixed size. Then the node address of the first node has offset 0 within the page, the node address of the second node has offset 32 with the page. In other embodiments, the physical location may be specified in other units, with another frame of reference, and with or without a fixed node size in any manner such that the node may be retrieved directly from the physical location without reading through the document to find the node.

The node tree index for each marked up document includes an entry for each node in the marked up document. The entry includes a node address as described above. In one embodiment, a hierarchical order key is mapped to a node address that maintains the physical location of the node within the document. In another embodiment, the hierarchical order key is mapped directly to the physical location of the node.

Handling Non-Conforming Documents

If a document does not conform to the markup language, a physical location of the document itself may be stored to facilitate access to the document during execution of a query against the document. In one example, a location of the document may be stored in association with a virtual node that represents the entire document. In one embodiment, the virtual node does not appear within the document or within queries that reference the document. The virtual node is used by the database server to reference the document as a node of text, allowing the database server to model non-marked-up documents as marked up documents where the context is defined as a virtual root node that represents the entire document.

In one embodiment, the database server stores an indication that the document did not conform to the markup language. In one example, the database server may store a value of NULL in a shadow column for the document when the document does not conform to the markup language. In one embodiment, an indication that a document did not conform to a markup language is stored in a log, and the log is provided to a user so that the user can identify the document and fix the document to conform to the markup language. In one embodiment, context-aware search is available on the conforming documents whether or not the user fixes the non-conforming documents.

Indexing Documents

Figure 5:
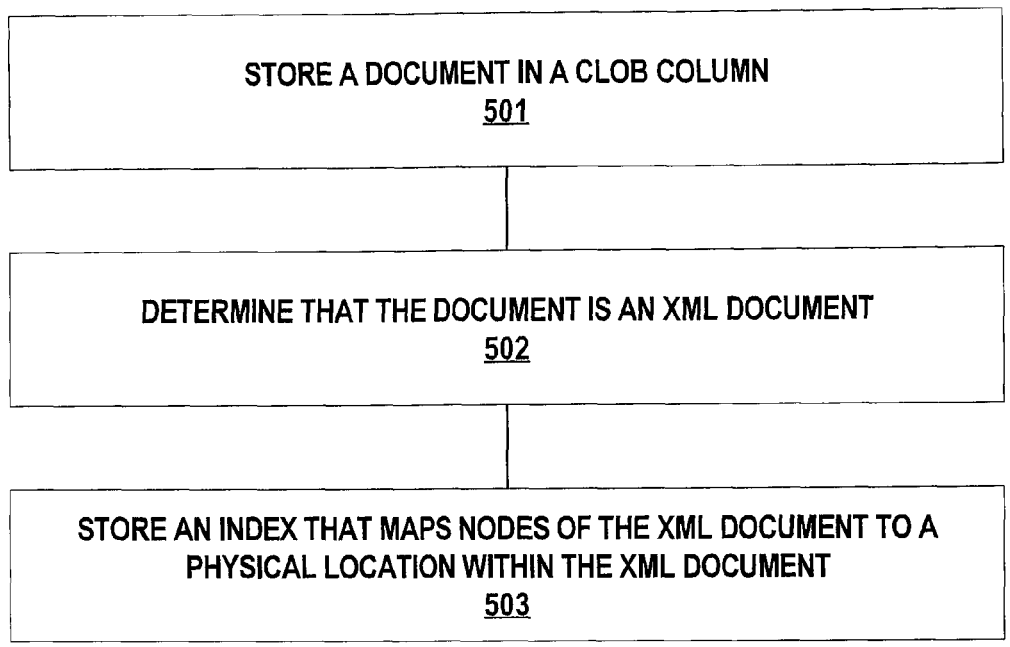
FIG. 5 is a diagram illustrating example steps for storing an index that supports context-aware search without destroying document fidelity.

FIG. 5 is a diagram illustrating example steps for storing an index that supports context-aware search without destroying document fidelity. In step 501, a document is stored in a CLOB column without identifying the document as an XML document and without decomposing the document into relational columns. In step 502, a database server determines that the document is an XML document. In step 503, the database server stores an index that maps nodes of the XML document to a physical location within the XML document.

Mapping Values to Nodes

To support an efficient full-text search of the documents, keywords, strings, or other values may be mapped to documents and nodes within the documents. Keywords from documents that do not conform to the markup language may be mapped to the documents themselves. Keywords from documents that do conform to the markup language may be mapped to nodes within the documents that contain the keywords. One or more indices may reflect these keyword to document and keyword to node mappings. In this manner, the database server may efficiently evaluate a query to determine the nodes and documents that contain a given value.

In one embodiment, the documents are identified by document identifiers, and the nodes are identified by a hierarchical order key (for example, 1, 1.1, 1.1.1, 1.1.2, 1.2, 1.2.1, etc.) within the document. The hierarchical order key identifies a hierarchical path to the node within the nodes of the document. In another embodiment, the nodes in the document are marked in a manner that provides context in the form of a label even though the labels are not organized hierarchically. The labels may be identified by keys (for example, 1, 2, 3, etc.) associated with the labels that appear within the document.

Hierarchical order key examples are provided in U.S. Pat. No. 7,499,915, entitled Index For Accessing XML Data, which has been incorporated by reference herein. According to one embodiment, the hierarchical order information is represented using a Dewey-type value. Specifically, in one embodiment, the OrderKey of a node is created by appending a value to the OrderKey of the node's immediate parent, where the appended value indicates the position, among the children of the parent node, of that particular child node.

For example, assume that a particular node D is the child of a node C, which itself is a child of a node B that is a child of a node A. Assume further that node D has the OrderKey 1.2.4.3. The final "3" in the OrderKey indicates that the node D is the third child of its parent node C. Similarly, the "4" indicates that node C is the fourth child of node B. The "2" indicates that Node B is the second child of node A. The leading "1" indicates that node A is the root node (i.e. has no parent).

Figure 3:
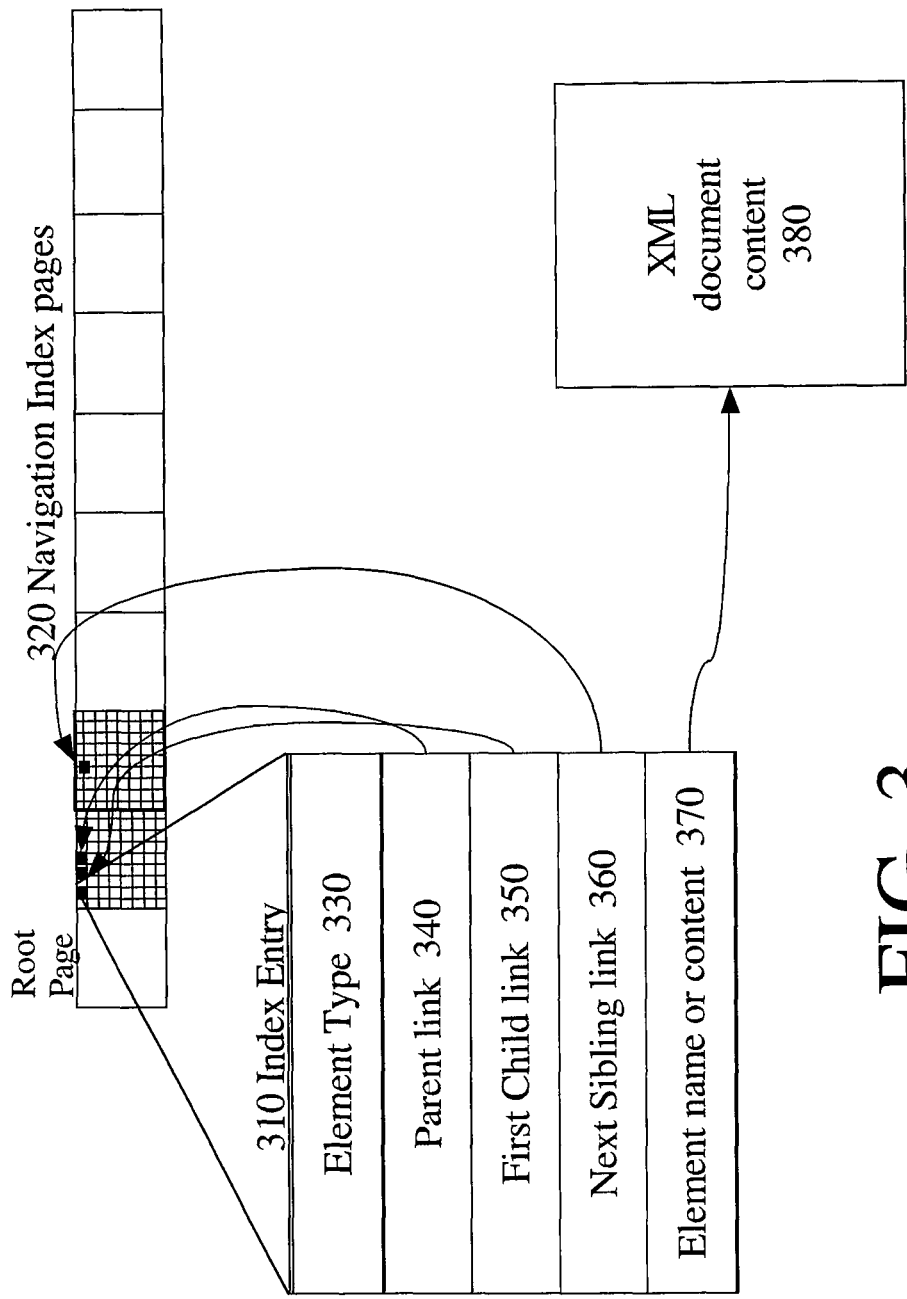
FIG. 3 is a diagram illustrating an example XML tree index entry for a node that stores a location of the node in an XML document.

A mapping of text values to documents and nodes may be indexed in order to facilitate an efficient full-text search. FIG. 1A illustrates example indices 106 that are provided for an XML document 105 that is stored in a CLOB 104 column in database 102. As shown, values from XML document 105 are mapped to document identifiers and keys. The illustrated example involves nodes a single XML document, but the indices could map any number of values to any number of documents and any number of nodes associated with those documents. Indices 106 also map document identifier and key pairs to a node tree entry 107 that stores the physical location of the node within XML document 105. An example node tree entry is shown in FIG. 3, where item 370 of index entry 310 stores a pointer to the physical location of the node within the XML document.

Mapping Nodes to Physical Locations within Documents

The nodes from the value-to-node index may be mapped to physical locations within documents. In one embodiment, a node from the value-to-node index is mapped to a virtual address or a physical address where the node may be found within a document. In another embodiment, a node from the value-to-node index is mapped to a node tree entry that maintains a physical location of the node.

In order to support an efficient full-text search of the documents, one or more indices can be stored to map nodes to physical locations. As illustrated in FIG. 1A, indices 106 store a mapping of nodes to node tree entries 107 that store physical locations. A direct mapping of nodes to physical locations may also be used.

Providing Context-Aware Search on Documents Stored in Unstructured Columns

In one embodiment, a user submits a search to the database server in the form of a query for a value that matches a context. The database server physically locates a node containing the value using the value-to-node mapping and the node-to-physical-location mapping. In one embodiment, if the located node is marked with the specified context, then the located node satisfies the query. A result of the search may contain text from the located node itself, text from related nodes, other text that is based on the located node containing the value and being marked with the context, or other information that indicates the located node satisfied the query. If the located node is not marked with the specified context, then the located node does not satisfy the query. A result of the search may contain information that indicates that the located node did not satisfy the query.

In one embodiment, a context-aware search may be performed on structured columns and unstructured columns that contain marked up data. Results of the query on the structured columns and unstructured columns may be combined before the results are provided to the user. In one embodiment, documents in unstructured columns are skipped when performing a context-aware search if the documents are not recognized as having marked up text, and documents in unstructured columns are not skipped if the documents are recognized as having marked up text.

In one embodiment, documents in unstructured columns that are not recognized as having marked up text are treated as text nodes with no hierarchical context within the text. A full-text search may be performed on the documents regardless of whether or not the documents contain marked up data. In one embodiment, a full-text query on an unstructured database column may be rewritten such that the query is evaluated against a virtual XML text node that represents an entire document in the unstructured database column. The virtual XML text node is mapped to the entire document. For example, a query such as "select * from t where contains (t.c, 'Smith')" may be rewritten as "select * from t where xmlexists(xmlcast(t.x as xml) '/' contains text "Smith"')."

In one embodiment, a full-text context-aware query may be expressed to reference a context. The context-aware query may be evaluated against the documents in the unstructured database column that conform to the markup language. For example, a query for "Smith" with the context "Name" may be expressed as "select * from t where xmlexists(xmlcast(t.c as xml) '//Name contains text "Smith"')". Based on the reference to the context, the database server may evaluate the query by accessing a physical location of the node within the document without accessing other nodes in other physical locations within the document.

As another example, the query below uses foo_xidx and searches for a document stored in mytext column of the table independent of whether the document is a valid xml document or not. First, an XML view is created on the parsed CLOB column as follows: "create view foo_xmlvu as select p.id xmlparse(LAX p.mytxt) as myxml from foo;". A query may be performed against valid XML documents stored in a CLOB column using the query as follows: "select v.id, xmlquery(v.myxml, '//text') from foo_xmlvu v where xmlexists(v.myxml, '//text ftcontains "xml" ftand "xquery"')." A virtual text node that represents the entire document may be referenced using a single '/' for the root path of the document. A single full-text query may be performed whether or not the documents are valid XML documents, as follows: "select v.id, xmlquery(v.myxml, '/') from foo_xmlvu v where xmlexists(v.myxml, '/ ftcontains "John" ftand "Smith"')". This provides a non-context-aware full-text search using the same framework for documents that conform to the markup language and documents that do not conform to the markup language.

FIG. 1A shows a query (pseudocode shown) 100a that returns a name of a contact where the name contains "Smith." The query is submitted to database server 101 by a client such as a user or an application. Database server 101 evaluates the query by mapping "Smith" to the document identifier of 1 and the keys of 1.1.1.2 and 1.2.1.2. Therefore, the database server can determine that the nodes matching the hierarchical keys of 1.1.1.2 and 1.2.1.2 in XML document 105 contain the keyword "Smith." In order to determine the physical location of the nodes within XML document 105, database server 101 maps the key of 1.1.1.2 to the node tree index entry at page:offset of 1:4 and the key of 1.2.1.2 to the node tree index entry at page:offset of 1:9.

The node tree index entry at page:offset of 1:4 points to the physical location of the first instance of the LAST node in XML document 105. Using the node tree index entry at 1:4, database server 101 may determine that the LAST node is a child of the NAME node, which is a child of the CONTACT node. Therefore, database server 101 can determine from the node tree index entries that the LAST node described at 1:4 meets the context specified by query 100a because LAST is contained within the NAME of a CONTACT.

The node tree index entry at page:offset of 1:9 points to the physical location of the second instance of the LAST node in XML document 105. Using the node tree index entry at 1:9, database server 101 may determine that the LAST node is a child of the NAME node, which is a child of the CONTACT node. Therefore, database server 101 can determine from the node tree index entries that the LAST node described at 1:9 meets the context specified by query 100a because LAST is contained within the NAME of a CONTACT.

In response to determining that the two LAST nodes satisfy query 100a, database server 101 provides the requested result 108a. In this case, the requested result is the name of the contact that has a name that contains "Smith." Thus, the result provided is the value of the two NAME nodes that satisfy the query: "<FIRST>John</FIRST> <LAST>Smith</LAST>," and "<FIRST>Tom</FIRST> <LAST>Smith</LAST>." As shown, the NODE tag itself is not returned with the value. However, the result may be formatted in any manner suitable to the client.

Figure 1B:
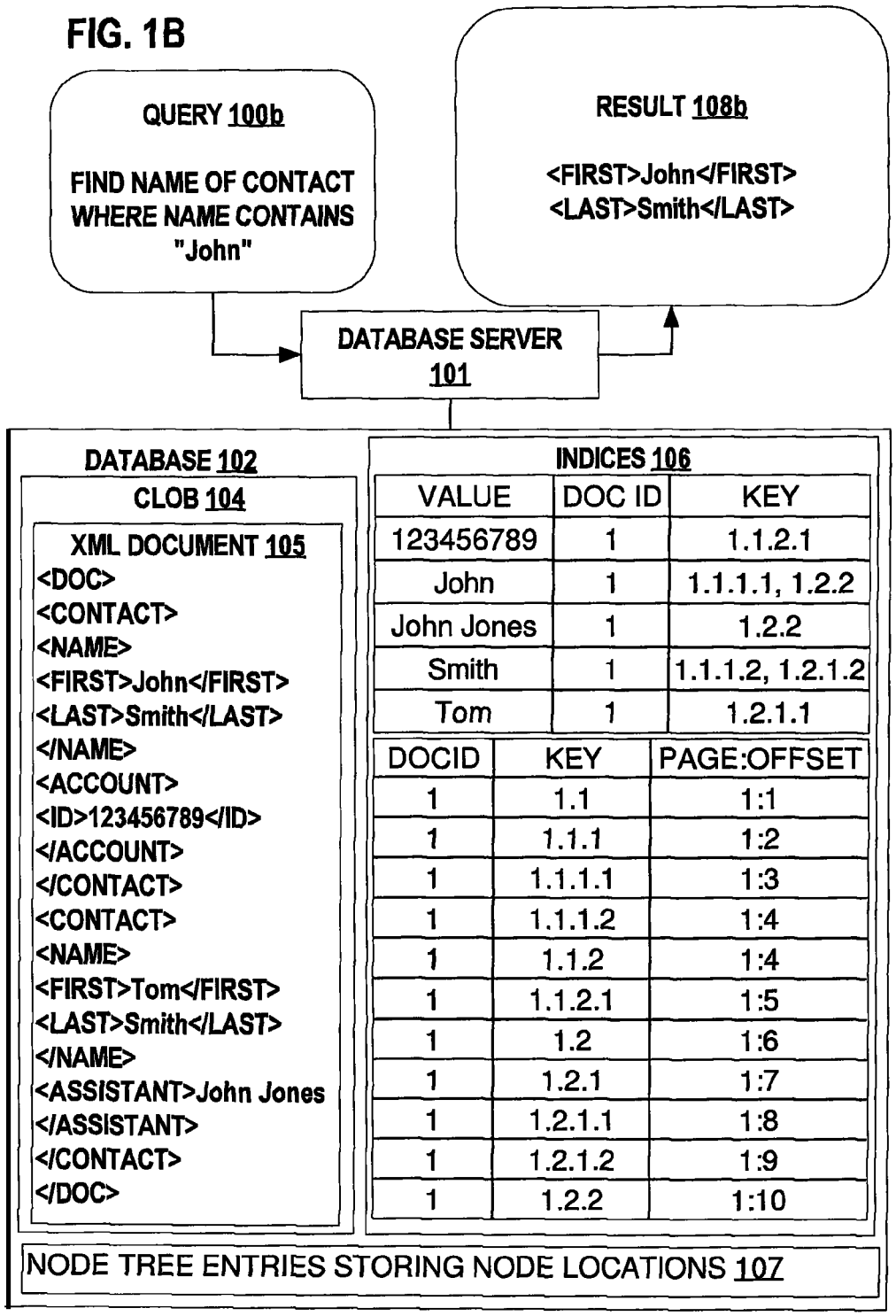

FIG. 1B shows a query (pseudocode shown) 100b that returns a name of a contact where the name contains "John." Database server 101 evaluates the query by mapping "John" to the document identifier of 1 and the keys of 1.1.1.1 and 1.2.2. Database server 101 maps the key of 1.1.1.1 to the node tree index entry at page:offset of 1:3 and the key of 1.2.2 to the node tree index entry at page:offset of 1:10.

The node tree index entry at page:offset of 1:3 points to the physical location of the first instance of the FIRST node in XML document 105. Using the node tree index entry at 1:3, database server 101 may determine that the FIRST node is a child of the NAME node, which is a child of the CONTACT node. Therefore, database server 101 can determine from the node tree index entries that the FIRST node described at 1:3 meets the context specified by query 100b because FIRST is contained within the NAME of a CONTACT.

The node tree index entry at page:offset of 1:10 points to the physical location of the ASSISTANT node in XML document 105. Using the node tree index entry at 1:10, database server 101 may determine that the ASSISTANT node is a child of the CONTACT node, but is not a child of the NAME node. Therefore, database server 101 can determine from the node tree index entries that the ASSISTANT node described at 1:10 does not meet the context specified by query 100b because ASSISTANT is not contained within NAME.

In response to determining that the first FIRST node satisfies query 100b, database server 101 provides the requested result 108b: "<FIRST>John</FIRST> <LAST>Smith</LAST>."

Figure 2A:
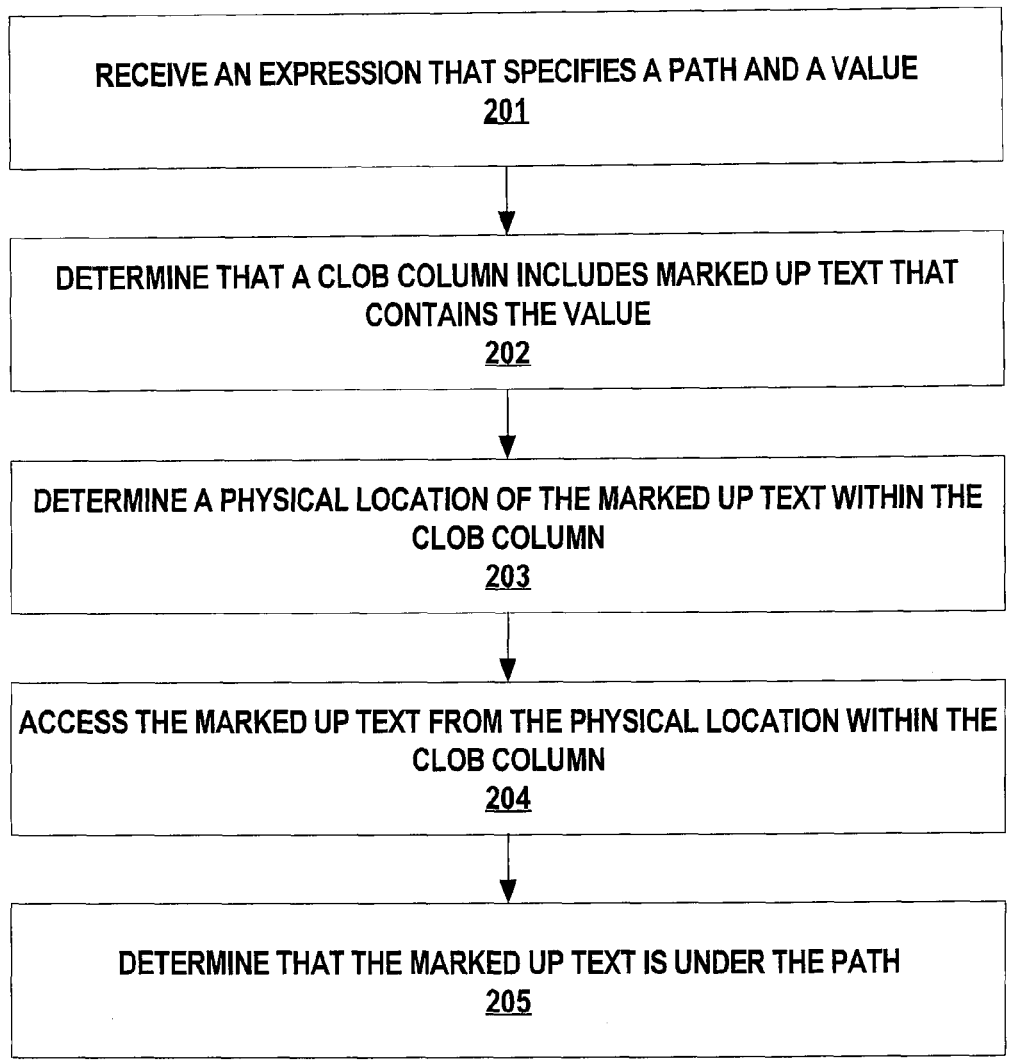

FIG. 2A illustrates example steps for performing a context-aware search against marked up text in a CLOB. In step 201, the database server receives an expression that specifies a path and a value. In step 202, the database server determines that a CLOB column includes marked up text that contains the value. The database server determines a physical location of the marked up text in step 203. The database server accesses the marked up text from the physical location in step 204. In one embodiment, the database server determines that the marked up text is under the path by using the node tree index entries.

Various embodiments do not use a node tree index. In one embodiment, step 205 may be performed by mapping a hierarchical order key to a path using a path index. The mapped-to path is compared to the path specified in the query to determine whether or not the node matches the specified path. In other embodiments, the steps of the method may be performed in other orders not shown.

As shown, the database server determines that the marked up text is under the path in step 205. However, the steps are not necessarily performed in the order shown. For example, step 205 may be performed simultaneously with, before, or after step 202 as shown in FIG. 2B.

Updating Indices

In one embodiment, the node tree index is automatically updated when the content of the XML documents changes to affect the physical location of the content within the document. For example, when a node is inserted into the hierarchy or the size of an element name or text value is changed, the physical locations for affected nodes must be updated to reflect the change. Thus, only the affected node tree index entries need to be changed. In one embodiment, a change in the XML document does not affect the mapping of nodes to node tree entries. In another embodiment, a mapping of nodes to physical locations is changed whenever a change to the XML document affects the physical location of the node. In one embodiment, the value-to-node mapping is updated whenever the XML document is changed to add or remove a value.

In one embodiment, a document stored in an unstructured database object is determined not to conform before an update to the unstructured database object. A user or an application modifies the document stored in the unstructured database object to add one or more tags, thereby creating a document that conforms to a recognized markup language. The database server detects that the change to the document stored in the unstructured database object, and, in response to the change, the database server recognizes that the document conforms to the markup language and indexes the document to support a context-aware search of the document. In this manner, users may adaptively modify documents on a document-by-document basis to increase the number of documents for which context-aware search is available, without specifically identifying documents as XML documents.

The Node Tree Index

In U.S. patent application Ser. No. 12/610,047, entitled Efficient XML Tree Indexing Structure Over XML Content, which has been incorporated by reference herein, techniques are provided for building and using a persistent XML tree index for navigating the nodes of an XML document, whether the XML document is stored in a database, in a persistent file system, or as a sequence in memory. The XML tree index is stored separately from the XML document content, and is able to optimize performance through the use of fixed-sized index entries. The XML document hierarchy need not be constructed in volatile memory, so creating and using the XML tree index scales even for large documents. To evaluate a path expression including descendant or ancestral syntax, navigation links can be read from persistent storage and used directly to find the elements specified in the path expression. The use of an abstract navigation interface allows applications to be written that are independent of the storage implementation of the index and the content.

For example, a persistent XML tree index may be created that allows direct navigation to the root of the hierarchy, a parent, ancestor, sibling, or child. There is no need to construct a DOM tree in memory before traversing links to perform a navigation operation because the index hierarchy may be saved persistently in non-volatile storage.

Each XML document may have its own separate XML tree index. An index may be generated and stored in response to a request to index a particular XML document. One index entry corresponds to one node of the corresponding XML document. There are both navigation links and links to content stored in each index entry. Navigation links point to other index entries for traversing the XML hierarchy, and content links point into the XML content storage. In one embodiment, an index entry for a node includes a content link that provides a physical location of the node within the XML document.

Referring to FIG. 3, each page of the Navigation Index 320 is divided into a set of fixed-sized index entries. An Index Entry 310 is comprised of the following information: element type, parent link, first child link, next sibling link, and a link into the XML content that either contains the element name or the element value if the element is a leaf node. Element Type 330 indicates the type of node that corresponds to the index entry and may be, for example, an element, attribute, text, comment, or processing instruction code. The arrows from the Parent Link 340, First Child Link 350, and Next Sibling Link 360 all point to other index entries within the XML tree index. The other index entries may reside in the same page or a different page as the index entry containing the links. Element name or content link 370 points to a physical location within the XML content itself. The XML content may contain variable-sized data.

The embodiment shown in FIG. 3 is a set of links for supporting DOM navigation. Additional links may be used for further performance enhancements including but not limited to having separate child element and attribute links, and a previous sibling link. That is, instead of linking elements and attributes together as siblings, there can be a list of attributes and a list of children elements, and a pointer to each list may be stored in the index entry. In addition, an index entry may include a flag to indicate that the index entry corresponds to a first child node or a last child node.

The size of each index entry may be selected to optimize the performance of accessing the data contained within each index entry. In one embodiment, the size of an index entry is selected so that each entry lies on an address boundary that is a power of two. Fast array arithmetic, for example using bit shifting operator instead of multiplication, may be used for determining the location of a desired index entry. The location of an index entry may be expressed as a (page number, offset number) tuple, where the offset number may also be referred to as the index entry number.

Figure 4A:
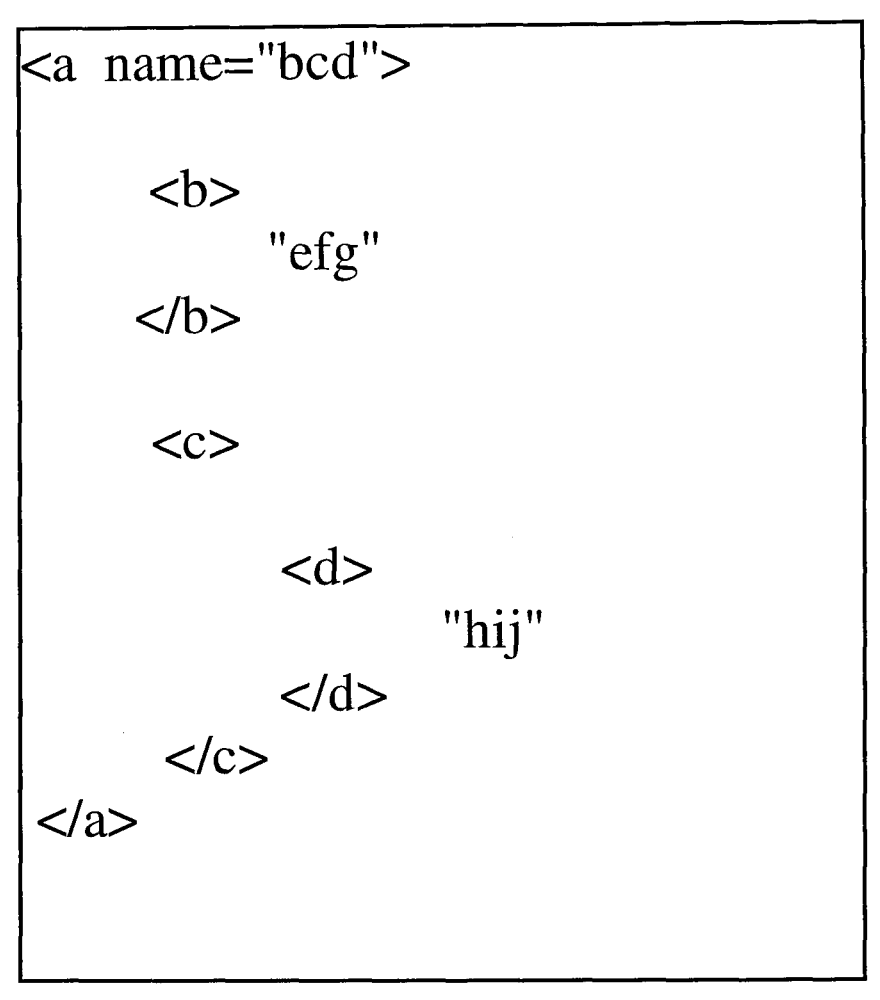
Figure 4B:
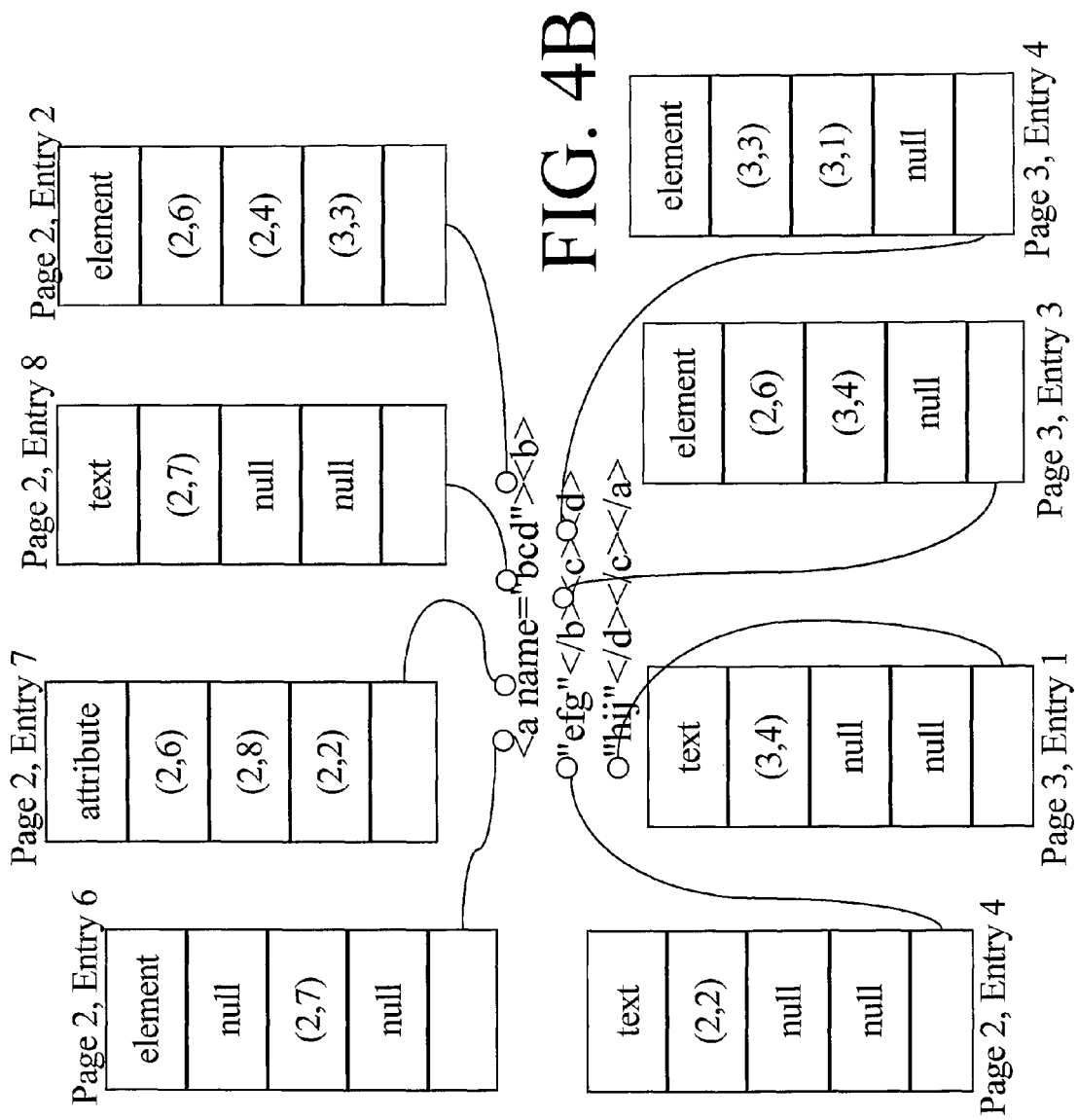
FIG. 4B is a diagram of example index entries for the example document in FIG. 4A.

FIG. 4A shows a simple XML document that is used in FIG. 4B to provide an example set of index entries representing an XML tree index on the example XML document shown in FIG. 4A. Each index entry is labeled with the page number and index entry number. The index entry number may be an offset of the entry from the beginning of the page. The links may be indicated by a (page number, entry number). Thus (1,1) may be a link that references the first entry of the first page of the XML tree index. In the example, the index entry corresponding to XML element "a" resides at (Page 2, Entry 6). Element "a" is the root entry of the document. As such, there are no parent or sibling links. In an embodiment where child and attribute links are treated as siblings (i.e., there is only one link to both children and attributes), the first child link corresponds to (Page 2, Entry 7) which represents the attribute "name." In an embodiment where there are separate links for first child and first attribute, the first attribute link corresponds to (Page 2, Entry 7). The content link for the root of the document points to a location within the content where the element name "a" is stored.

The index entry for the attribute "name" has a parent link back to the entry representing element "a". The index entry points to a child entry represented by (Page 2, Entry 8). The sibling link points to the entry representing element "b" located at (Page 2, Entry 2), because element 2 is the next child of element "a" that follows the attribute "name." The content link for the attribute points to a location in the content where the attribute name "name" is stored.

(Page 2, Entry 8) represents an XML leaf node containing the content of the attribute. The content link points to a location in the content where the value "bcd" is stored. The attribute value has a parent link to the attribute name but contains no child or sibling links.

There are many possible embodiments for how the content links are represented. In one embodiment, where the XML is a sequence of bytes, the content link may be a byte offset from the beginning of the document. In another embodiment, the strings may be parsed out of the XML document and placed in a table, with the content link referencing the symbol table entry corresponding to the string content. Different embodiments may be storage dependent. For example, if XML content is stored as binary XML, the link to the content may be a token identifier that can be used to retrieve the content from the token table.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 6:
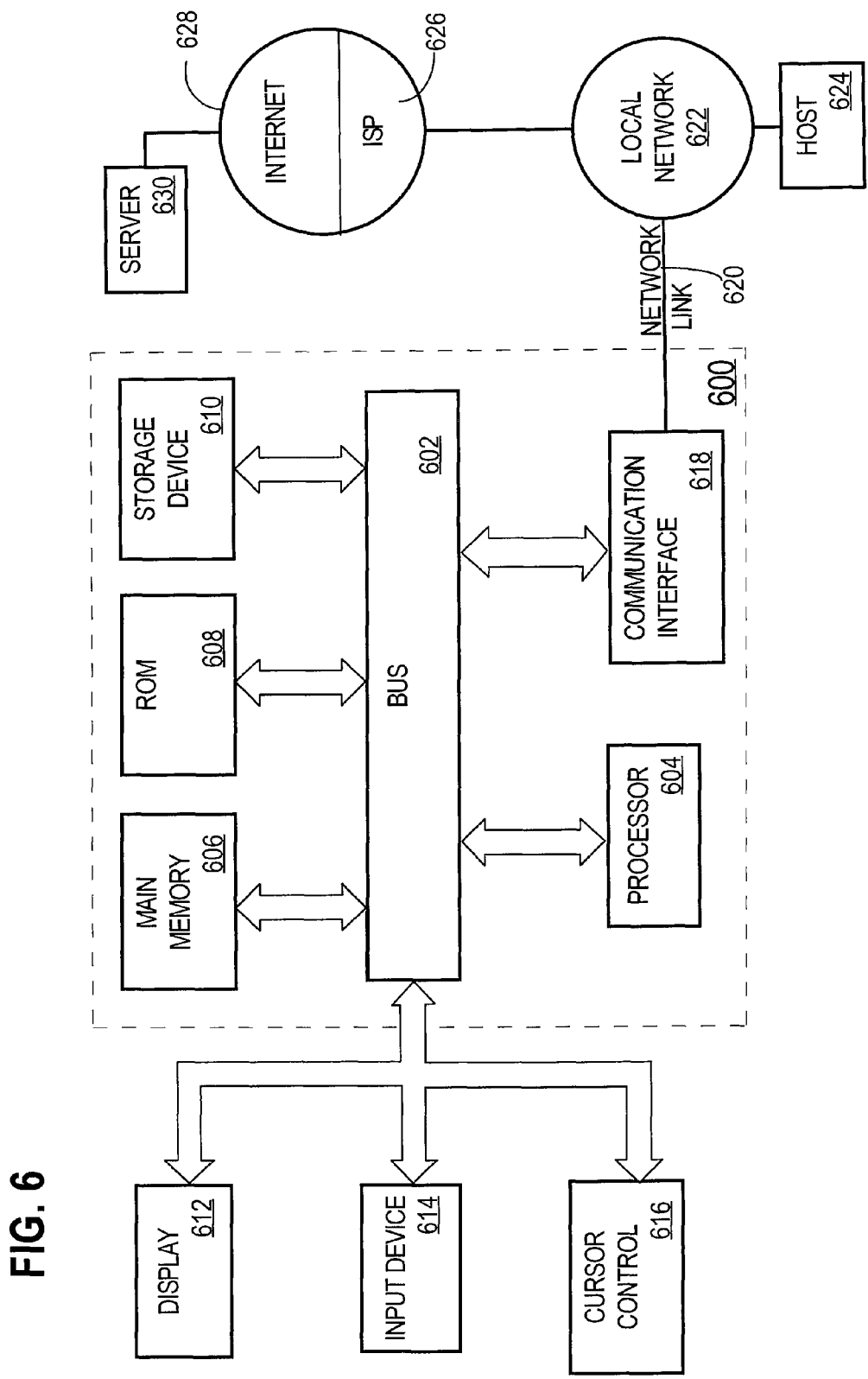
FIG. 6 is a diagram of an example computer system upon which the techniques described herein may be implemented.

For example, FIG. 6 is a block diagram that illustrates a computer system 600 upon which an embodiment of the invention may be implemented. Computer system 600 includes a bus 602 or other communication mechanism for communicating information, and a hardware processor 604 coupled with bus 602 for processing information. Hardware processor 604 may be, for example, a general purpose microprocessor.

Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Such instructions, when stored in storage media accessible to processor 604, render computer system 600 into a special-purpose machine that is customized to perform the operations specified in the instructions.

Computer system 600 further includes a read only memory (ROM) 608 or other static storage device coupled to bus 602 for storing static information and instructions for processor 604. A storage device 610, such as a magnetic disk or optical disk, is provided and coupled to bus 602 for storing information and instructions.

Computer system 600 may be coupled via bus 602 to a display 612, such as a cathode ray tube (CRT), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

Computer system 600 may implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor 604 executing one or more sequences of one or more instructions contained in main memory 606. Such instructions may be read into main memory 606 from another storage medium, such as storage device 610. Execution of the sequences of instructions contained in main memory 606 causes processor 604 to perform the process steps described herein. In alternative embodiments, hard-wired circuitry may be used in place of or in combination with software instructions.

The term "storage media" as used herein refers to any media that store data and/or instructions that cause a machine to operation in a specific fashion. Such storage media may comprise non-volatile media and/or volatile media. Non-volatile media includes, for example, optical or magnetic disks, such as storage device 610. Volatile media includes dynamic memory, such as main memory 606. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 602. Transmission media can also take the form of acoustic or light waves, such as those generated during radio-wave and infra-red data communications.

Various forms of media may be involved in carrying one or more sequences of one or more instructions to processor 604 for execution. For example, the instructions may initially be carried on a magnetic disk or solid state drive of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card, cable modem, satellite modem, or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are example forms of transmission media.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618.

The received code may be executed by processor 604 as it is received, and/or stored in storage device 610, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
a server analyzing portions of data, including a particular portion of data, that are stored in an unstructured database column in a database to determine whether or not the portions of data include marked up text, wherein, prior to analyzing the portions of data, the portions of data, as stored, were not defined as marked up text;
without changing the particular portion of data that is stored in the unstructured database column, the server determining that the particular portion contains a marked up text node as a descendant of an ancestor node, and the server storing a location of the marked up text node and an indication that the marked up text node is a descendant of the ancestor node;
the server receiving an expression that specifies a value and a hierarchical path;
the server evaluating the expression against the unstructured database column at least in part by:
the server accessing the marked up text node from the location without scanning the particular portion of data;
the server determining that the marked up text node contains the specified value; and
the server determining that the marked up text node is under the hierarchical path based at least in part on the indication;
wherein the method is performed, by the server, on one or more computing devices.

2. The method of claim 1, wherein the marked up text node is marked according to a hierarchical markup language as being under the hierarchical path in a document that is stored in the unstructured database column, and wherein the document stores other marked up text nodes that are marked according to the hierarchical markup language as not being under the hierarchical path.

3. The method of claim 1, wherein the unstructured database column is one of a variable character field, a character large object, or a binary large object.

4. The method of claim 1, wherein the expression comprises an XQuery that specifies an XPath, wherein the particular portion of data comprises an XML document, and wherein the unstructured database column stores the XML document in the database in a manner that maintains document fidelity for the XML document.

5. The method of claim 1, the method comprising accessing one or more indices to determine that the unstructured database column in the database stores the marked up text node that contains the specified value, wherein the one or more indices also store the location of the marked up text node, wherein the one or more indices use a key to identify the marked up text node.

6. The method of claim 1, wherein the marked up text node is marked with tags according to a hierarchical markup language, and wherein the determining that the marked up text node is under the hierarchical path comprises accessing an entry for the marked up text node node that is linked to another entry for the ancestor node in a node tree, wherein the ancestor node is marked with tags according to the hierarchical markup language.

7. The method of claim 1, comprising determining, from an index that maps a hierarchical order key of the marked up text node to the hierarchical path, that the marked up text node is marked as being under the hierarchical path, wherein the hierarchical path mapped to by the index indicates that the marked up text node is a descendant of the ancestor node, and wherein the method is performed without accessing any other nodes of the particular portion.

8. The method of claim 1, wherein the particular portion is at least part of a first document, wherein the expression is a first expression, wherein the value is a first value, and wherein the location is a first location, the method comprising:
 receiving a second expression that specifies a second value;
 determining that the unstructured database column in the database stores a second document, wherein the second document comprises non-marked up text that contains the specified value;
 determining a second location of the second document; and
 accessing the second document from the second location.

9. The method of claim 8, further comprising rewriting the second expression to reference a virtual node that represents the second document, wherein the virtual node does not appear in the second expression, and wherein the virtual node does not appear in the second document.

10. The method of claim 1, wherein the particular portion is at least part of a first document, the method comprising:
 determining that the unstructured database column in the database stores a second document of non-marked up text;
 in response to determining that the unstructured database column in the database stores the second document of non-marked up text, skipping the second document when evaluating the expression.

11. A method comprising:
 a server storing a document in an unstructured database column in a database, wherein the document, as stored, is not defined as being marked according to a markup language;
 the server analyzing the document to determine that the document comprises nodes that are marked according to the markup language as being under hierarchical paths;
 in response to determining that the document comprises the nodes that are marked according to the markup language as under the hierarchical paths, the server storing one or more indices that map the nodes to locations where the nodes are stored within the document, wherein the one or more indices also indicate that at least one node of the nodes is an ancestor of at least one other node of the nodes;
 wherein the method is performed, by the server, on one or more computing devices.

12. The method of claim 11, wherein determining that the document comprises the nodes that are marked according to the markup language as under the hierarchical paths is performed in response to detecting a change to the document, and wherein the change comprises an addition of one or more tags that mark one or more of the nodes as being under hierarchical paths.

13. The method of claim 11, wherein the document is a first document, and wherein the locations are first locations, further comprising:
 storing a second document in the unstructured database column in the database;
 determining that the second document does not conform to the markup language;
 in response to the determining that the second document does not conform to the markup language, storing in the one or more indices a mapping of a virtual node to a second location of the second document.

14. The method of claim 11, wherein the one or more indices map one or more values to one or more of the nodes by mapping the one or more values to the document and one or more hierarchical positions within the document.

15. The method of claim 11, wherein the document is a set of raw text data that conforms to XML, and wherein the storing the document in the unstructured database column in the database maintains document fidelity for the document.

16. One or more non-transitory storage media storing instructions which, when executed by one or more computing devices, cause performance of:
 a server analyzing portions of data, including a particular portion of data, that are stored in an unstructured database column in a database to determine whether or not the data includes marked up text-, wherein, prior to analyzing the portions of data, the portions of data, as stored, were not defined as marked up text;
 without changing the particular portion of data that is stored in the unstructured database column, the server determining that the particular portion contains a marked up text node is a descendant of an ancestor node, and the server storing a location of the marked up text node and an indication that the marked up text node is a descendant of the ancestor node;
 the server receiving an expression that specifies a value and a hierarchical path;
 the server evaluating the expression against the unstructured database column at least in part by:
  the server accessing the marked up text node from the location without scanning the particular portion of data;
  the server determining that the marked up text node contains the specified value; and
  the server determining that the marked up text node is under the hierarchical path based at least in part on the indication.

17. One or more non-transitory storage media as recited in claim 16, wherein the marked up text node is marked with tags according to a hierarchical markup language, and wherein the instructions, when executed by the one or more computing devices, cause performance of determining that the marked up text node is under the hierarchical path by causing the one or more computing devices to access an entry for the marked up text node that is linked to another entry for the ancestor node in a node tree, wherein the ancestor node is marked with tags according to the hierarchical markup language.

18. One or more non-transitory storage media as recited in claim 16, wherein the instructions, when executed by the one or more computing devices, cause performance of determining, from an index that maps a hierarchical order key of the marked up text node to the hierarchical path, that the marked up text node is under the hierarchical path, wherein the hierarchical path mapped to by the index indicates that the marked up text node is a descendant of the ancestor node, and wherein the method is performed without accessing any other nodes of the particular portion.

19. One or more non-transitory storage media storing instructions which, when executed by one or more computing devices, cause performance of:

a server storing a document in an unstructured database column in a database, wherein the document, as stored, is not defined as being marked according to a markup language;

the server analyzing the document to determine that the document comprises nodes that are marked according to the markup language as being under hierarchical paths;

in response to determining that the document comprises the nodes that are marked according to the markup language as under the hierarchical paths, the server storing one or more indices that map the nodes to locations where the nodes are stored within the document, wherein the one or more indices also indicate that at least one node of the nodes is an ancestor of at least one other node of the nodes.

20. One or more non-transitory storage media as recited in claim 19, wherein the instructions, when executed by the one or more computing devices, cause performance of determining that the document comprises the nodes that are marked according to the markup language as under the hierarchical paths in response to detecting a change to the document, and wherein the change comprises an addition of one or more tags that mark one or more of the nodes as being under the hierarchical path.

21. One or more non-transitory storage media as recited in claim 16, wherein the particular portion is at least part of a first document, wherein the expression is a first expression, wherein the value is a first value, and wherein the location is a first location, wherein the instructions, when executed by the one or more computing devices, cause performance of:

receiving a second expression that specifies a second value;

determining that the unstructured database column in the database stores a second document, wherein the second document comprises non-marked up text that contains the specified value;

determining a second location of the second document; and accessing the second document from the second location.

22. One or more non-transitory storage media as recited in claim 21, wherein the instructions, when executed by the one or more computing devices, cause performance of rewriting the second expression to reference a virtual node that represents the second document, wherein the virtual node does not appear in the second expression, and wherein the virtual node does not appear in the second document.

23. One or more non-transitory storage media as recited in claim 16, wherein the particular portion is at least part of a first document, wherein the instructions, when executed by the one or more computing devices, cause performance of:

determining that the unstructured database column in the database stores a second document of non-marked up text;

in response to determining that the unstructured database column in the database stores the second document of non-marked up text, skipping the second document when evaluating the expression.

24. One or more non-transitory storage media as recited in claim 16, wherein the expression comprises an XQuery that specifies an XPath, wherein the particular portion of data comprises an XML document, and wherein the unstructured database column stores the XML document in the database in a manner that maintains document fidelity for the XML document.

25. One or more non-transitory storage media as recited in claim 16, wherein the instructions, when executed by the one or more computing devices, cause performance of accessing one or more indices to determine that the unstructured database column in the database stores the marked up text node that contains the specified value, wherein the one or more indices also store the location of the marked up text node, wherein the one or more indices use a key to identify the marked up text node.

26. One or more non-transitory storage media as recited in claim 19, wherein the document is a first document, and wherein the locations are first locations, wherein the instructions, when executed by the one or more computing devices, cause:

storing a second document in the unstructured database column in the database;

determining that the second document does not conform to the markup language;

in response to the determining that the second document does not conform to the markup language, storing in the one or more indices a mapping of a virtual node to a second location of the second document.

27. One or more non-transitory storage media as recited in claim 19, wherein the one or more indices map one or more values to one or more of the nodes by mapping the one or more values to the document and one or more hierarchical positions within the document.

28. One or more non-transitory storage media as recited in claim 19, wherein the document is a set of raw text data that conforms to XML, and wherein the storing the document in the unstructured database column in the database maintains document fidelity for the document.

29. The method of claim 8, wherein the first document and the second document are stored in the unstructured database column without indicating whether the first document conforms to the markup language, and without indicating whether the second document conforms to the markup language.

30. The method of claim 10, wherein the first document and the second document are stored in the unstructured database column without indicating whether the first document conforms to the markup language, and without indicating whether the second document conforms to the markup language.

31. The method of claim 13, wherein the first document and the second document are stored in the unstructured database column without indicating whether the first document conforms to the markup language, and without indicating whether the second document conforms to the markup language.

32. One or more non-transitory storage media as recited in claim 21, wherein the first document and the second document are stored in the unstructured database column without indicating whether the first document conforms to the markup language, and without indicating whether the second document conforms to the markup language.

33. One or more non-transitory storage media as recited in claim 23, wherein the first document and the second document are stored in the unstructured database column without indicating whether the first document conforms to the markup language, and without indicating whether the second document conforms to the markup language.

34. One or more non-transitory storage media as recited in claim 26, wherein the first document and the second document are stored in the unstructured database column without indicating whether the first document conforms to the markup language, and without indicating whether the second document conforms to the markup language.

* * * * *

UNITED STATES PATENT AND TRADEMARK OFFICE
CERTIFICATE OF CORRECTION

PATENT NO. : 8,447,785 B2
APPLICATION NO. : 12/792659
DATED : May 21, 2013
INVENTOR(S) : Liu et al.

It is certified that error appears in the above-identified patent and that said Letters Patent is hereby corrected as shown below:

In the Claims:

In column 19, line 1, in Claim 6, delete "node node" and insert -- node --, therefor.

In column 20, line 22, in Claim 16, delete "text-," and insert -- text; --, therefor.

Signed and Sealed this
Tenth Day of September, 2013

Teresa Stanek Rea
*Acting Director of the United States Patent and Trademark Office*